US006807488B2

(12) United States Patent
van Borselen

(10) Patent No.: US 6,807,488 B2
(45) Date of Patent: Oct. 19, 2004

(54) METHOD OF IDENTIFICATION OF NON-PRIMARY EVENTS IN SEISMIC DATA

(75) Inventor: Roald G. van Borselen, Walton-on-Thames (GB)

(73) Assignee: PGS Americas, Inc., Houston, TX (US)

( * ) Notice: Subject to any disclaimer, the term of this patent is extended or adjusted under 35 U.S.C. 154(b) by 133 days.

(21) Appl. No.: 09/822,115

(22) Filed: Mar. 30, 2001

(65) Prior Publication Data

US 2002/0143470 A1 Oct. 3, 2002

(51) Int. Cl.[7] .................................................. G01V 1/28
(52) U.S. Cl. ........................................................ 702/17
(58) Field of Search .............................. 702/17, 16, 18

(56) References Cited

U.S. PATENT DOCUMENTS

| | | | | |
|---|---|---|---|---|
| 4,312,050 A | * | 1/1982 | Lucas | 367/44 |
| 5,563,949 A | | 10/1996 | Bahorich et al. | 702/16 |
| 5,671,136 A | * | 9/1997 | Willhoit, Jr. | 702/18 |
| 6,330,512 B1 | * | 12/2001 | Thomas et al. | 702/1 |
| 6,393,365 B1 | * | 5/2002 | Runnestrand et al. | 702/17 |
| 6,519,205 B1 | * | 2/2003 | Baeten et al. | 367/45 |

FOREIGN PATENT DOCUMENTS

GB        2 217 458 A        10/1989

OTHER PUBLICATIONS

Sheriff, R., Surface–Related Multiple Elimination, and Inversion Approach, Encyclopedic Dictionary of Exploration Geophysics Third edition, 1 Geophysical References Series, 1991, pp. cover page, title page, copyright page, pp. 1 and 18.

Verschuur, E., Surface–Related Multiple Elimination, and Inversion Approach, PhjD thesis, Delft University, ISBN 90–9004520–1, 1991, pp. Cover page, copyright page, pp. 1–5.

* cited by examiner

Primary Examiner—Marc S. Hoff
Assistant Examiner—Anthony Gutierrez
(74) Attorney, Agent, or Firm—E. Eugene Thigpen

(57) ABSTRACT

A method is disclosed for identifying primary events in seismic data. The method includes sorting the data by frequency so that at least some primary events are separated from non-primary events, thus generating a frequency sorted gather. Amplitudes in the frequency sorted gather above a selected base amplitude are attenuated. The events are then coherency filtered and the attenuated amplitudes are replaced with amplitudes corresponding to the coherent events.

18 Claims, 3 Drawing Sheets

METHOD OF IDENTIFICATION OF NON-PRIMARY EVENTS IN SEISMIC DATA

This invention relates to seismic signal processing generally and specifically relates to the identification and attenuation of non-primary events in seismic data.

In seismic data processing, identification and attenuation of non-primary events (e.g. multiples, ghosts, etc.) is desirable. One specific example of such efforts is the so-called multiple diffraction attenuation (MDA), which is a processing technique that has been designed by PGS Data Processing to attenuate high-energy reverberations of near-surface diffractions. Such reverberations are commonly seen on deep-water datasets with complex, shallow sub-seabed topography such as those recently acquired by PGS offshore Nigeria and in the South Rockall Trough.

Conventional MDA processing is based on the assumption that, at greater depths, multiples tend to have significantly higher amplitudes at higher frequencies than primaries do. The reason for this is greater primary absorption that is caused by (1) increased wave-field spreading (longer travel-paths) and (2) higher absorption. FIG. 1 illustrates the conventional procedure. In the high frequency constituent of the data, high amplitudes HA are identified by comparing amplitudes to the rms amplitude in a user-defined window. The boundaries of the window are dependant upon the specific shapes of the events expected bases on a priori knowledge and are within the skill of those in the art. For example, when amplitudes are higher than, say, two times the rms amplitude, then these amplitudes are zeroed. After stacking the high and low frequency constituents, the conventional MDA result is obtained. Although this method has proven to be an effective noise removal tool, the major disadvantage of the method is that it cannot separate high-amplitude primaries from high-amplitude multiples. As a result, high-amplitude primaries may be partly muted, as indicated by the discontinuous primaries P. Clients often recognize this disadvantage; and, as a result, the method is often not applied.

Therefore, there is a continuing need for a method of identification non-primary events, and it is an object of the present invention to provide for that need.

SUMMARY OF THE INVENTION

According to one aspect of the present invention, a method is provided for identifying primary seismic events in seismic data, the method comprising:
  applying a coherency filter to the seismic data;
  sorting the data according to an event characteristic having a tendency to separate primary from non-primary events; and
  selectively attenuating according to the characteristic and the coherency of the events.

According to a more specific example of the present aspect, the coherency filter is applied in windows, the characteristic comprises amplitude in a limited range of frequencies, and the attenuation comprises reduction of amplitude (e.g. muting).

According to another broad aspect of the invention a system is provides for identifying primary seismic events in seismic data, the method comprising:
  means for applying a coherency filter to the seismic data;
  means for sorting the data according to an event characteristic having a tendency to separate primary from non-primary events; and
  means for selectively attenuating according to the characteristic and the coherency of the events.

According to still another aspect of the present invention, there is provided a method of identification of primary events in seismic data, the method comprising:
  sorting the data by frequency wherein at least some non-primary events are separated from primary events, wherein a frequency-sorted gather of data results;
  attenuating in the frequency-sorted gather amplitudes above a pre-selected base amplitude, wherein attenuated amplitudes result;
  applying a coherency filter to the events, wherein coherent events are identified;
  replacing with amplitudes from the coherent events attenuated amplitudes in the frequency-sorted gather corresponding to the coherent events.

According to a more specific example of the present aspect, the attenuating comprises reducing amplitude. According to an alternative example, the attenuating comprises muting.

According to another aspect of the present invention, there is provided a method of identification of primary events in seismic data, the method comprising:
  sorting the data by frequency wherein at least some non-primary events are separated from primary events, wherein a frequency-sorted gather of data results;
  applying a coherency filter to the events, wherein coherent events are identified;
  attenuating in the frequency-sorted gather amplitudes above a pre-selected base amplitude which are not associated with the coherent events, wherein attenuated amplitudes result.

According to a more specific example of the present aspect, the attenuating comprises reducing amplitude. According to an alternative example, the attenuating comprises muting.

According to yet another aspect of the present invention, there is provided a system of identification of primary events in seismic data, the method comprising:
  means for sorting the data by frequency wherein at least some non-primary events are separated from primary events, wherein a frequency-sorted gather of data results;
  means for attenuating in the frequency-sorted gather amplitudes above a pre-selected base amplitude, wherein attenuated amplitudes result;
  means for applying a coherency filter to the events, wherein coherent events are identified;
  means for replacing with amplitudes from the coherent events attenuated amplitudes in the frequency-sorted gather corresponding to the coherent events.

According to a more specific example of the present aspect, the means for attenuating comprises means for reducing amplitudes. According to another example, the means for attenuating comprises means for muting.

According to still a further aspect of the present invention, a system of identification of primary events in seismic data is provided, the system comprising:
  means for sorting the data by frequency wherein at least some non-primary events are separated from primary events, wherein a frequency-sorted gather of data results;
  means for applying a coherency filter to the events, wherein coherent events are identified;
  means for attenuating in the frequency-sorted gather amplitudes above a pre-selected base amplitude which are not associated with the coherent events, wherein attenuated amplitudes result.

According to a more specific example of the present aspect, the means for attenuating comprises means for reducing amplitude. According to an alternative example, the means for attenuating comprises means for muting.

DESCRIPTION OF THE PREFERRED EMBODIMENTS OF THE INVENTION

Figure 1:
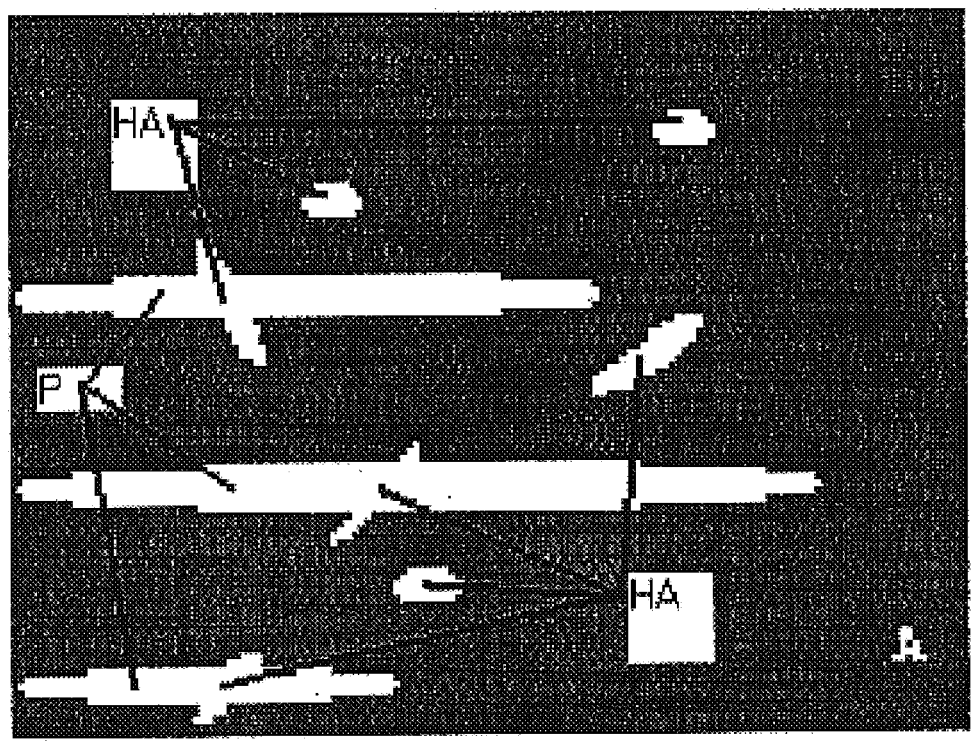
FIG. 1 is a plot of a set of seismic data used in accordance with an example embodiment of the present invention.
Figure 2A:
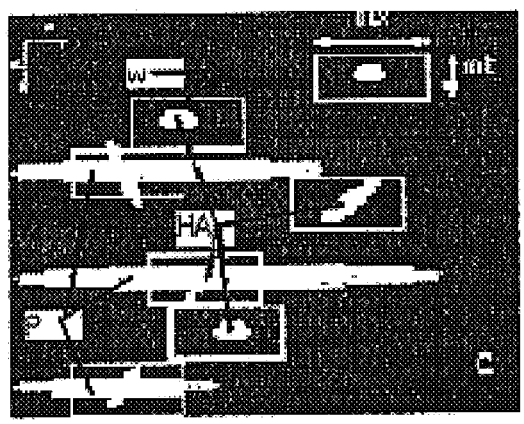
FIG. 2a is a plot of a set of seismic data used in accordance with an example embodiment of the present invention.

Referring now to FIG. 2a, an example of the present invention will be illustrated in which coherency filters are applied in windows W surrounding high amplitude events HA in the high frequency content of seismic survey data. Various forms of coherency filters are useful according to the invention, and their design and selection will be within the skill of those in the art upon review of the present description. In the illustrated example, NMO-corrected CDP gathers are seen, although other gathers that will occur to those of skill in the art will also suffice. After application of the coherency filter, a smoothed CDP gather is obtained in which non-coherent events are significantly attenuated. Primary events are more coherent that non-primaries.

The seismic data are also subjected to processing in which amplitudes HA over a pre-determined value in the higher frequency components of the data are attenuated. The amplitudes HA for attenuation are determined, as will be understood by those of skill in the art, by examination of the frequency content and amplitudes of specific data sets. In some embodiments, the amplitudes HA for attenuation comprise rms amplitudes, while in other embodiments, the amplitudes HA for attenuation comprise peak amplitudes. Still other amplitude measurements within the scope of the present invention will occur to those of skill in the art.

Likewise, the distinction between those frequencies in which significant amplitude differences exist between primaries and non-primary events is survey specific and is selected based on examination of the particular data. In an alternative embodiment, however, the pre-determined value of the amplitude is not based on data examination, but rather it is chosen by the experience of the processor or pre-set in the processing software on which the method of the present invention is run.

Figure 2B:
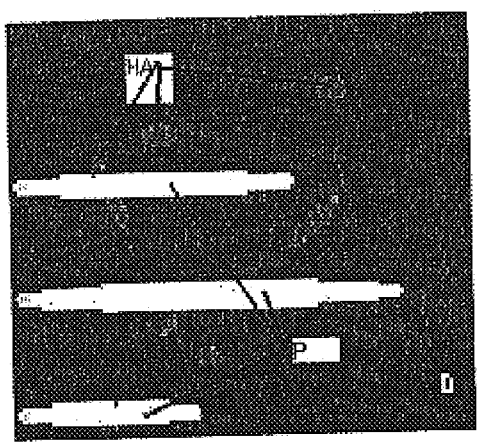
FIG. 2b is a plot of a set of seismic data used in accordance with an example embodiment of the present invention.
Figures 3A, 3B, 3C, 3D, 3E:
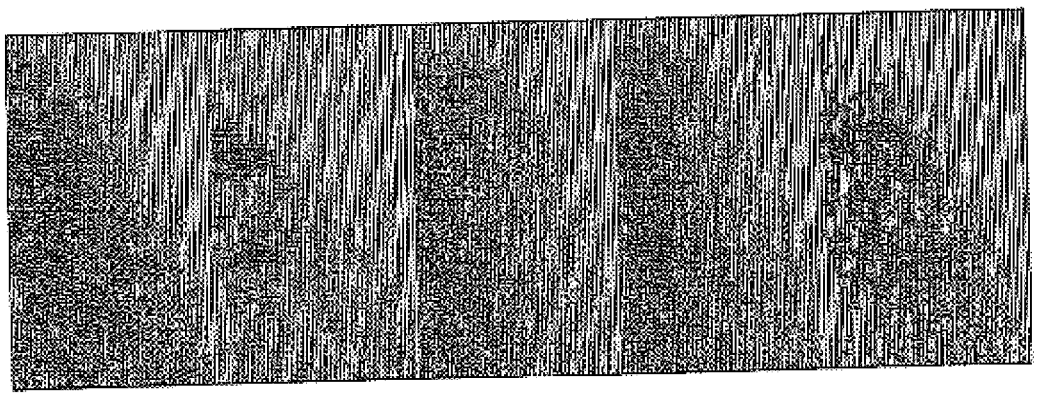
FIGS. 3a–3e is a plot of gathers of seismic data used to illustrate examples of the present invention.

Referring now to FIG. 2b, the attenuated samples high-frequency amplitude attenuation are replaced by the corresponding samples from the coherency filter method. As a result, high-amplitude, coherent primaries P are maintained, whereas non-coherent multiples are strongly attenuated.

Referring now to FIGS. 3a–e, the application of an example method of the present invention is seen. The first gather (FIG. 3a) shows the high-frequency constituent of an arbitrary CDP gather after NMO correction. The second gather (FIG. 3b) shows the same gather, after application of coherency filtering. The third gather (FIG. 3c) shows the same gather after application of conventional MDA. Note the strong attenuation of the high-amplitude primaries. The fourth gather (FIG. 3d) shows the result after application of the present invention. Note the significant reduction of incoherent high-amplitude events, as well as the preservation of the coherent events that are believed to be primaries. Finally, the fifth gather (FIG. 3e) shows the difference plot between the present invention and conventional MDA.

The above method is carried out according to various systems. In one such system, illustrated in FIG. 4, means 40 for sorting the data D by frequency separates at least some non-primary events (NPE) from primary events (PE), wherein a frequency-sorted gather of data (FSG) results. The means 40 is in communication with means 44 for attenuating in the frequency-sorted gather (FSG) amplitudes above a pre-selected base amplitude, wherein a new frequency-sorted gather with selected attenuated amplitudes (FSGAA) results. In turn, means 40 is in communication with means 46 for applying a coherency filter (CF) to the events, wherein coherent events (CE) are identified. Finally, means 44 and means 46 are connected to means 48 for replacing with amplitudes from the coherent events attenuated amplitudes in the frequency-sorted gather corresponding to the coherent events. The result is a frequency-sorted gather with attenuated non-primary events with substantially unattenuated primary events.

According to still a further aspect of the present invention, an alternative system of identification of primary events in seismic data is provided, the system comprising means 40 for sorting the data by frequency wherein at least some non-primary events (NPE) are separated from primary events (PE), wherein a frequency-sorted gather (FSG) of data results. The means 40 is connected to means 46 for applying a coherency filter (CF) to the events, wherein coherent events (CE) are identified. In this embodiment, means 44 attenuates in the frequency-sorted gather amplitudes above a pre-selected base amplitude which are not associated with the coherent events, wherein a frequency-sorted gather with attenuated non-primary events but substantially unattenuated primary events results.

Figure 4:
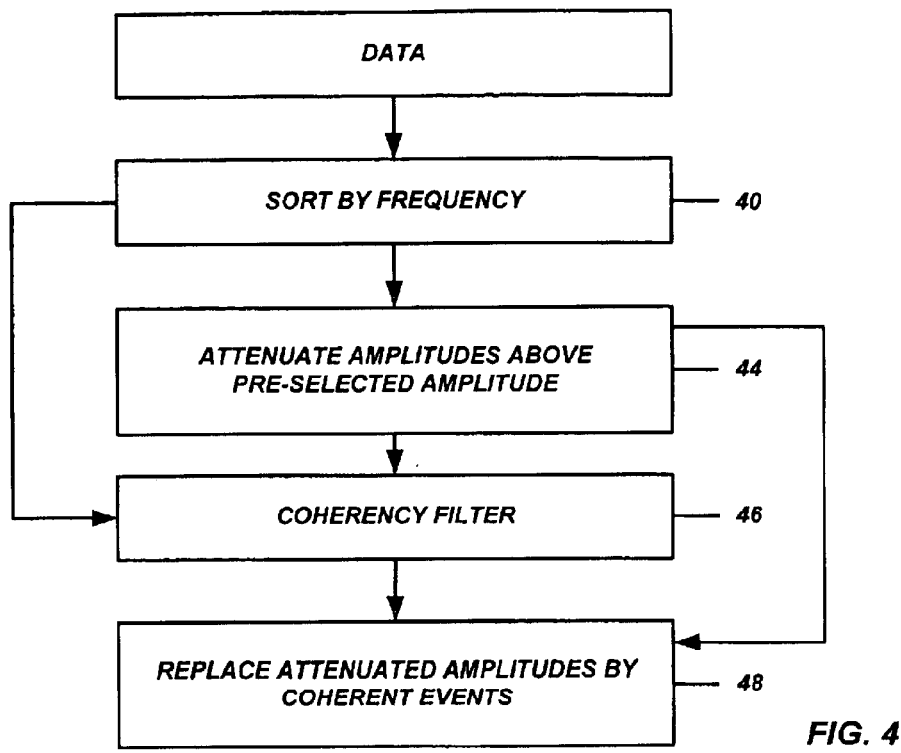
FIG. 4 is a block diagram of an example embodiment of the present invention.
Figure 5:
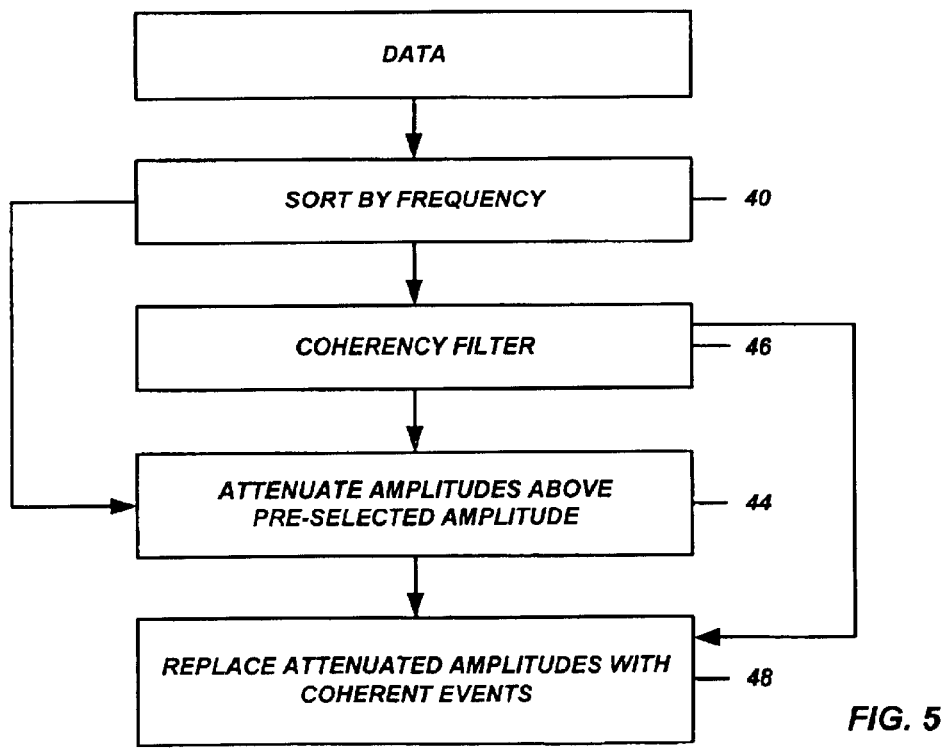
FIG. 5 is a block diagram of an example embodiment of the present invention.

In one more specific example of the systems of FIGS. 4 and 5, the means 44 for attenuating comprises means for reducing amplitudes. According to another example, the means for attenuating 44 comprises means for muting.

As will be understood by those of skill in the art, the various means 40–46 comprise, in some embodiments, hard-wired circuitry (either analog, digital, or some combination of the two) or, alternatively, computer hardware, programmed as will occur to those of skill in the art to perform the functions described. In still other embodiments, the means 40–48 comprise objects and classes of code which are connected in a computer as will occur to those of skill in the art.

The above embodiments are given by way of example, only. Other embodiments will occur to those of skill in the art that do not depart from the spirit of the present invention.

What is claimed is:

1. A method of identification of primary events in seismic data, the method comprising:
   sorting the data by frequency wherein at least some non-primary events are separated from primary events, wherein a frequency sorted gather of data results;
   attenuating in the frequency-sorted gather amplitudes above a pre-selected base amplitude, wherein attenuated amplitudes result;

applying a coherency filter to the events, wherein coherent events are identified; and replacing the attenuated amplitudes in the frequency-sorted gather with amplitudes corresponding to the coherent events.

2. A method as in claim 1 wherein the attenuating comprises reducing amplitude.

3. A method as in claim 1 wherein the attenuating comprises muting.

4. A method of identification of primary events in seismic data, the method comprising:

sorting the data by frequency wherein at least some non-primary events are separated from primary events, wherein a frequency-sorted gather of data results;

applying a coherency filter to the events, wherein coherent events are identified; and attenuating in the frequency-sorted gather amplitudes above a pre-selected base amplitude which are not associated with the coherent events, wherein attenuated amplitudes result.

5. A method as in claim 4 wherein the attenuating comprises reducing amplitude.

6. A method as in claim 4 wherein the attenuating comprises muting.

7. A system of identification of primary events in seismic data, the method comprising:

means for sorting the data by frequency wherein at least some non-primary events are separated from primary events, wherein a frequency-sorted gather of data results;

means for attenuating in the frequency-sorted gather amplitudes above a pre-selected base amplitude, wherein attenuated amplitudes result;

means for applying a coherency filter to the events, wherein coherent events are identified; and means for replacing with amplitudes from the coherent events attenuated amplitudes in the frequency-sorted gather corresponding to the coherent events.

8. A system as in claim 7 wherein the means for attenuating comprises means for reducing amplitudes.

9. A system as in claim 7 wherein the means for attenuating comprises means for muting.

10. A system of identification of primary events in seismic data, the system comprising:

means for sorting the data by frequency wherein at least some non-primary events are separated from primary events, wherein a frequency-sorted gather of data results;

means for applying a coherency filter to the events, wherein coherent events are identified; and means for attenuating in the frequency-sorted gather amplitudes above a pre-selected base amplitude which are not associated with the coherent events, wherein attenuated amplitudes result.

11. A system as in claim 10 wherein the means for attenuating comprises means for reducing amplitude.

12. A system as in claim 10 wherein the means for attenuating comprises means for muting.

13. A method of identifying primary events in seismic data, the method comprising:

sorting the seismic data according to frequency;

applying a coherency filter to the seismic data; and selectively attenuating events in the seismic data, wherein the selectively attenuating is dependent upon the frequency and coherency of events identified by the coherency filtering.

14. A method as in claim 13 in which the coherency filter is applied in windows.

15. A method as in claim 13 in which the attenuation comprises reduction of amplitude.

16. A method as in claim 15 in which the attenuation comprises muting.

17. A method as in claim 16 in which the coherency filter is applied in windows.

18. A system for identifying primary events in seismic data comprising:

means for sorting the seismic data according to frequency;

means for coherency filtering the seismic data; and means selectively attenuating events in the seismic data, the means for selectively attenuating dependent upon the frequency and coherency of events determined by the means for coherency filtering.

* * * * *